W. WINDER & H. McNALLY.
MILK SEDIMENT TESTER.
APPLICATION FILED AUG. 9, 1917.
1,264,243.
Patented Apr. 30, 1918.
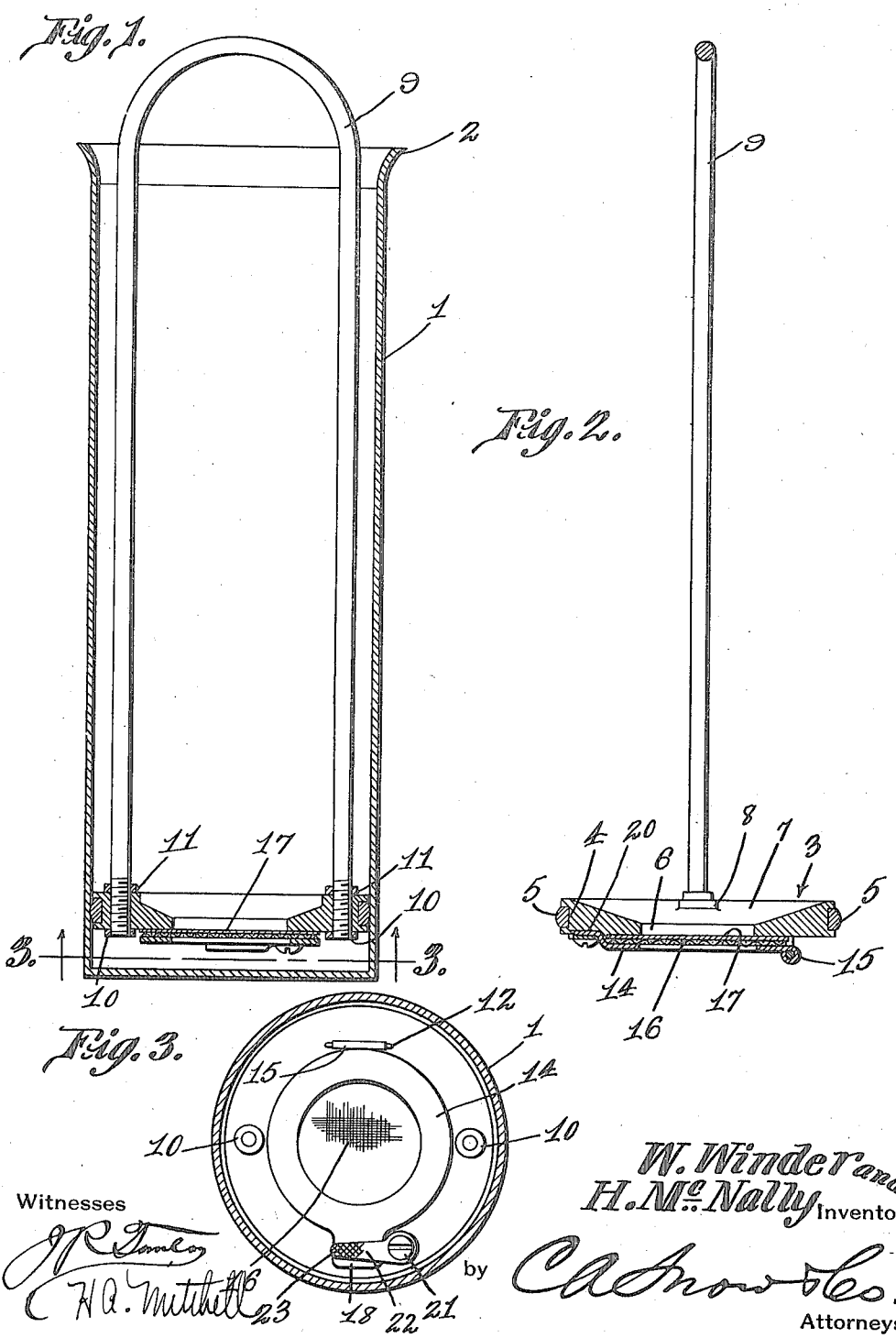
Witnesses
W. Winder and
H. McNally Inventors
by
Attorneys

UNITED STATES PATENT OFFICE.

WILLIAM WINDER AND HUGH McNALLY, OF RICHLAND CENTER, WISCONSIN.

MILK-SEDIMENT TESTER.

1,264,243.

Specification of Letters Patent.

Patented Apr. 30, 1918.

Application filed August 9, 1917. Serial No. 185,384.

*To all whom it may concern:*

Be it known that we, WILLIAM WINDER and HUGH McNALLY, citizens of the United States, residing at Richland Center, in the county of Richland, State of Wisconsin, have invented a new and useful Milk-Sediment Tester, of which the following is a specification.

The device forming the subject matter of this application is adapted to be employed for determining the amount of sediment in milk and like liquids.

The invention aims to improve the construction of a piston which, working within a receptacle, constitutes a means whereby the sediment may be removed for examination.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in longitudinal section, a tester constructed in accordance with the invention;

Fig. 2 is a longitudinal section showing the piston, the cutting plane in Fig. 2 being at right angles to the cutting plane in Fig. 1;

Fig. 3 is a section on the line 3—3 of Fig. 1.

In carrying out the present invention there is provided a cylindrical receptacle 1 which may be made of any desired material. If the receptacle 1 is made of glass, it may be graduated longitudinally, as is common with various receptacles for chemical work and other purposes. The receptacle 1 preferably has a common internal diameter from its bottom to a point adjacent its top, the receptacle 1 being flared at its upper end as shown at 2, to facilitate the introduction of the piston into the receptacle.

The piston is denoted generally by the numeral 3 and is provided with a peripheral groove 4 in which is seated a packing ring 5, adapted to have close sliding contact with the receptacle 1, to the end that the piston may move practically air-tight in the receptacle. The piston 3 has a central opening 6, and the upper face 7 of the piston is concaved or slanted toward the opening 6, so as to deposit readily therein, any sediment which may occur in the milk or other liquid being tested. The piston 3 is provided with oppositely disposed, upstanding bosses 8 projecting from the concaved face 7 of the piston, the upper surfaces of the bosses 8 being disposed at right angles to the axis of the piston.

Any suitable means may be provided for raising and lowering the piston 3. In the present instance, a U-shaped bail 9 is provided for this purpose, the lower ends of the bail 9 passing removably through the bosses 8 and the piston 3. Lower nuts 10 are threaded onto the ends of the bail 9 and bear against the under surface of the piston 3. Upper nuts 11 are threaded onto the ends of the bail and coact with the upper faces of the bosses 8 on the piston 3, the bail 9 being securely attached in this manner to the piston 3.

A U-shaped hanger 12 is mounted in the piston 3 and depends below the lower face of the piston. The numeral 14 marks a closure for the opening 6, the closure being in the form of a ring, of somewhat larger diameter than the opening 6, so as to bind against the lower surface of the piston 3, a filter 17 which is interposed between the closure and the lower surface of the piston, the filter extending across the opening 6. The filter may be made of any desired substance, but a disk of cotton will be found useful. The closure 14 is provided with an eye 15 engaged with the hanger 12, so that the closure may be swung toward and away from the piston 3, to facilitate the introduction and removal of the filter 17. The closure 14 includes a fine mesh screen 16 extended beneath the filter 17 and constituting a means for supporting the filter below the opening 6 in the piston 3. The closure 14 is supplied with a projecting keeper 18, the end of which is thinned as shown in the drawings, the under side of the piston having a seat 20 in which the keeper 18 of the closure is received. A pivot element 21 is mounted in the piston 3 and on the pivot element is mounted to swing, in a direction at right angles to the axis of the piston, a latch 22, which may have some resiliency. The latch 22 may be roughened as shown at 23 to facilitate the manipulation of the latch.

The filter 17 is placed against the under side of the piston 3 across the opening 6, the element 14 is swung to a closed position against the under side of the piston, the periphery of the filter 17 being bound against the piston by the closure 14, and the screen 16 serving to support the filter. The latch 22 is engaged with the keeper 18 and thus the closure 14 and the filter 17 are held in place. Because the keeper 18 is so constructed that it will fit in the seat 20 of the piston 3, the latch 22 will engage readily with the keeper when the latch is swung on its pivot element 21.

In practical operation, the piston 3 is pushed to the bottom of the receptacle 1 by means of the bail 9, and the milk or other liquid to be tested is deposited in the receptacle. After the sediment has settled, or even before the sediment has settled, in some instances, the piston 3 may be pulled upwardly by means of the bail 9. Since the ring 5 bears air-tight on the inner surface of the receptacle 1, a partial vacuum will be created beneath the piston 3 as the latter is raised, the liquid, as a consequence, being drawn downwardly through the filter 17 and the screen 16, the concavity 7 of the piston 3 serving to aid in depositing the sediment in the opening 6, and consequently on the filter 17.

When the piston 3 is removed from the receptacle 1, the sediment will be found collected on the filter 17, and the filter may be removed by disengaging the latch 22 from the keeper 18 of the closure 14 and by swinging the closure away from the piston 3 on the hinged connection 15—12.

Having thus described the invention, what is claimed is:—

1. A milk sediment tester comprising a receptacle; a piston movable therein and having an opening; a foraminous closure for the opening; means for securing the closure movably to the piston; and a filter extended across the opening, the filter being bound between the closure and the piston.

2. In a milk sediment tester, a receptacle; a piston movable in the receptacle, the piston having an opening, and having a slanting upper face coöperating with the opening; a packing ring mounted on the periphery of the piston and coacting with the receptacle; a filter extended across the opening; and means for binding the filter against the piston.

3. A milk sediment tester comprising a receptacle; a piston movable therein and having an opening; a foraminous member extended across the opening and carried by the piston; and a filter extended across the opening and supported by the foraminous member.

In testimony that we claim the foregoing as our own, we have hereto affixed our signatures in the presence of two witnesses.

WILLIAM WINDER.
HUGH McNALLY.

Witnesses:
WILLIAM NISBET,
J. A. DISTER.